UNITED STATES PATENT OFFICE.

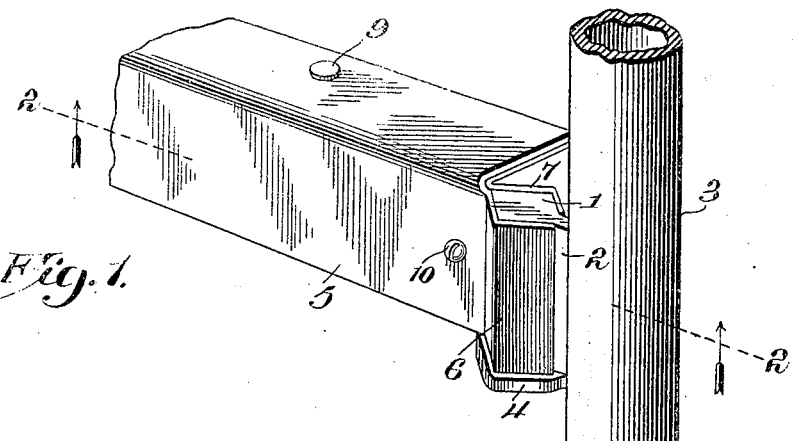
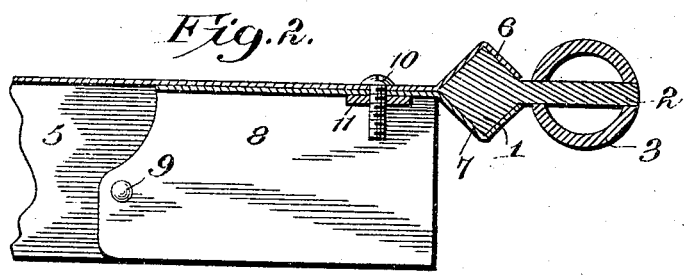
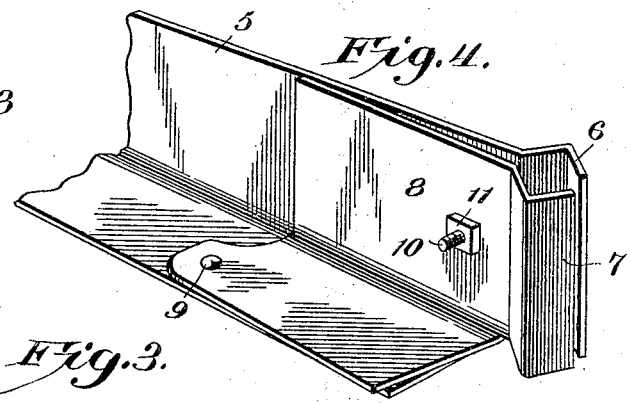
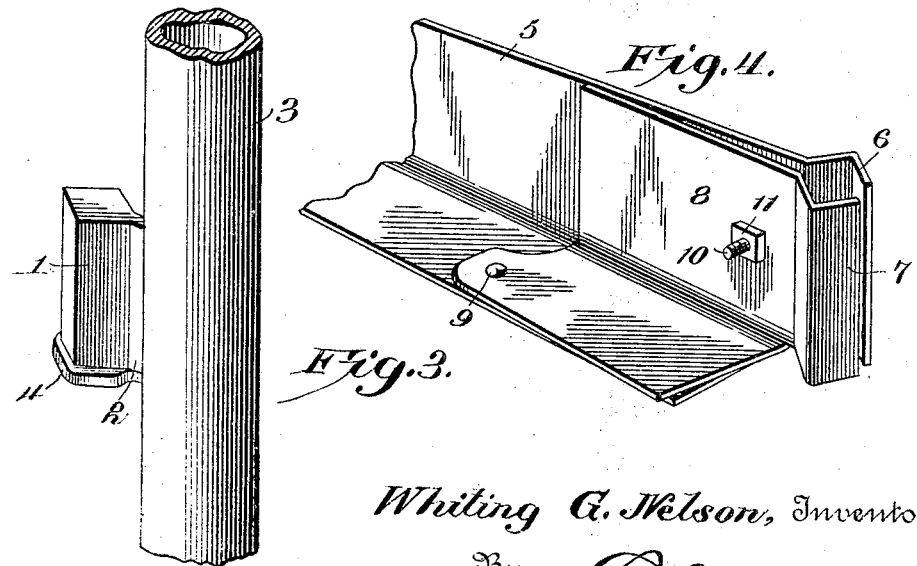

WHITING GRISWOLD NELSON, OF GREENVILLE, MICHIGAN, ASSIGNOR TO FRANCINE M. NELSON, OF GREENVILLE, MICHIGAN.

CORNER-FASTENING FOR BEDSTEADS.

No. 801,472.  Specification of Letters Patent.  Patented Oct. 10, 1905.

Application filed July 9, 1904. Serial No. 215,889.

*To all whom it may concern:*

Be it known that I, WHITING GRISWOLD NELSON, a citizen of the United States, residing at Greenville, in the county of Montcalm and State of Michigan, have invented a new and useful Corner-Fastening for Bedsteads, of which the following is a specification.

The invention relates to improvements in bedsteads, more especially the corner-fastenings of the same.

The object of the present invention is to improve the construction of corner-fastenings for metal bedsteads and to provide a simple, inexpensive, and efficient device adapted to lessen the weight without reducing the strength of a bedstead and capable of securely fastening the side rails to the corner-posts and of effectually preventing the same from being shaken or jarred loose.

A further object of the invention is to provide a corner-fastening of this character adapted to permit the side rails of a bedstead to be reversed in order that the horizontal flange may be arranged either at the top or bottom and capable of admitting of the use of any bed-spring.

Another object of the invention is to provide a corner-fastening adapted to permit the parts of a bedstead to be readily assembled and separated, so that the same may be conveniently handled, packed, and shipped.

The invention also has for its object to provide a corner-fastening having a clamping device capable of ready adjustment to engage properly any corner-posts constructed for its use and adapted to effectually prevent any side motion.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a corner-fastening for bedsteads, constructed in accordance with this invention. Fig. 2 is a horizontal sectional view taken on the line 2 2 of Fig. 1. Fig 3 is a detail perspective view of a portion of the corner-posts, illustrating the construction of the stud. Fig. 4 is a detail perspective view of the clamp.

Like numerals of reference designate corresponding parts in all the figures of the drawings.

1 designates a stud arranged vertically at one end of an arm 2, which is mounted on the corner-post 3 of a metal bedstead, the corner-post being of the usual construction, and the arm being preferably secured in a slot or opening of the same; but the arm may be applied to the post in any desired manner and may constitute an integral portion thereof, as will be readily understood. The stud, which extends from the top to the bottom of the arm, is provided at its bottom with a shoulder 4, and is adapted to be engaged by a clamp of the side rail 5 of the bedstead. The shoulder or ledge 4 is formed by a marginal flange which projects from the lower end of the stud.

The side rail is designed to be constructed of angle-iron in the ordinary manner, being composed of vertical and horizontal flanges, the vertical flange being extended beyond the horizontal flange to provide a fixed jaw 6, which coöperates with a movable jaw 7 of an angle-plate 8. The angle-plate 8, which is composed of vertical and horizontal flanges, is arranged within the side rail and has its horizontal flange pivoted to the lower face of the horizontal flange of the side rail by a rivet 9 or other suitable fastening device. The pivot permits the vertical flange of the angle-plate to swing to and from the vertical flange of the side rail of the bedstead. The vertical flange of the angle-plate is connected with the vertical flange of the side rail by a bolt 10, having a nut 11 and adapted to draw the jaws together, whereby the same are caused to firmly clamp the stud. The head of the bolt or screw 10 is arranged at the exterior of the side rail and is provided with a groove to receive the blade of a screw-driver, whereby it may be readily held or rotated while the nut is engaged and held by a wrench.

The stud 1 of the accompanying drawings is substantially rectangular in cross-section, and the jaws are angled to conform to the configuration of the same; but it will be readily apparent that the stud may be of any other configuration and that the jaws will conform to the shape of the same. The inner engaging faces of the jaws may be either smooth or corrugated to secure the desired clamping action, and, if desired, the clamp may directly engage the corner-posts. The jaws of the clamp are movable toward and from each other and are capable of adjustment to engage snugly any corner-posts constructed for its use.

The device dispenses with the heavy castings often employed in corner-fastenings of metal bedposts, and in this manner it reduces the weight without impairing the strength of the bedstead. The clamp is readily operated and will enable the parts of a bedstead to be conveniently handled, packed, and shipped, and when the parts are assembled the clamp will effectually prevent any side motion and there will be no liability of the parts becoming loose through any jar or vibration. Also it will be clear that the clamp renders the side rail reversible, so that the horizontal flange may be arranged either at the top or bottom and that any form of bed-spring may be used.

Having thus fully described my invention, what I claim as new, and desire to secure by Letters Patent, is—

1. In a corner-fastening for bedsteads, the combination of a corner-post having a projecting stud, and a clamp comprising a corner-rail having an integral fixed clamping-jaw, and a movable clamping-jaw coöperating with the fixed clamping-jaw, said jaws being similarly bent to conform to the configuration of the stud.

2. A corner-fastening for bedsteads, comprising a clamp composed of an angle side rail provided with vertical and horizontal flanges and having its vertical flange extended and shaped to form a fixed clamping-jaw, and a movable clamping-jaw pivotally mounted on the horizontal flange of the angle side rail and coöperating with the jaw of the same and adjustably connected with the said jaw, and a corner-post provided with means to be engaged by the said jaws.

3. A corner-fastening for bedsteads provided with a clamp composed of an angle side rail provided with vertical and horizontal flanges and having its vertical flange extended beyond its horizontal flange to form a fixed clamping-jaw, an angle-plate having vertical and horizontal flanges to fit the side rails and provided with a jaw coöperating with the jaw of the side rail, and means for adjustably connecting the jaws.

4. A corner-fastening for bedsteads provided with a clamp comprising an angle side rail provided with vertical and horizontal flanges and having its vertical flange extended beyond the horizontal flange to form a fixed clamping-jaw, an angle-plate having vertical and horizontal flanges to fit the side rail and having its horizontal flange pivoted to the horizontal flange of the side rail, said plate being provided with a jaw, and means for adjusting the angle-plate.

5. In a corner-fastening for bedsteads, the combination of a corner-post provided with a projecting horizontal arm and having an angular stud at the outer end thereof, said stud extending from the top to the bottom of the arm and provided at its lower end with a stop-flange, and a side rail provided with a clamp engaging the stud and resting on the flange.

6. In a corner-fastening for bedsteads, the combination of a corner-post provided with a vertical stud having a stop at the bottom, a reversible angle side rail provided with vertical and horizontal flanges and having a fixed projecting jaw, an angle-plate having vertical and horizontal flanges to fit the side rails and pivoted to the same and having a jaw, said jaws being arranged to engage the stud of the post, and means for adjustably connecting the jaws.

7. In a corner-fastening for bedsteads, the combination of a vertical stud provided with an arm, a corner-post having a slot to receive the arm and carrying the said stud, a side rail, and clamping-jaws carried by the side rail and engaging the stud.

In testimony that I claim the foregoing as my own I have hereto affixed my signature in the presence of two witnesses.

WHITING GRISWOLD NELSON.

Witnesses:
WM. H. BROWNE,
W. D. JOHNSON.